April 29, 1930.    G. E. ARMINGTON ET AL    1,756,231
AIRPLANE
Filed Nov. 5, 1927

INVENTORS
George E. Armington
Robert G. Nightingale
BY
Kwis, Hudson & Kent
ATTORNEYS Patented Apr. 29, 1930

1,756,231

UNITED STATES PATENT OFFICE

GEORGE E. ARMINGTON, OF WICKLIFFE, AND ROBERT G. NIGHTINGALE, OF CLEVE-
LAND, OHIO, ASSIGNORS TO THE GLENN L. MARTIN COMPANY, OF CLEVELAND,
OHIO, A CORPORATION OF OHIO

AIRPLANE

Application filed November 5, 1927. Serial No. 231,246.

This invention relates to improvements in airplanes, having to do particularly with means for reducing air resistance and a strut securing means employed for accomplishing that purpose.

One of the objects of the invention is the reduction of air resistance by carrying the strut walls all of the way to the wing surfaces.

Another object is the provision of special brackets and fittings located partially within the strut to render it possible to secure the strut to a wing beam or other wing frame member by means of fastenings that do not project appreciably beyond the strut walls.

Figure 1:
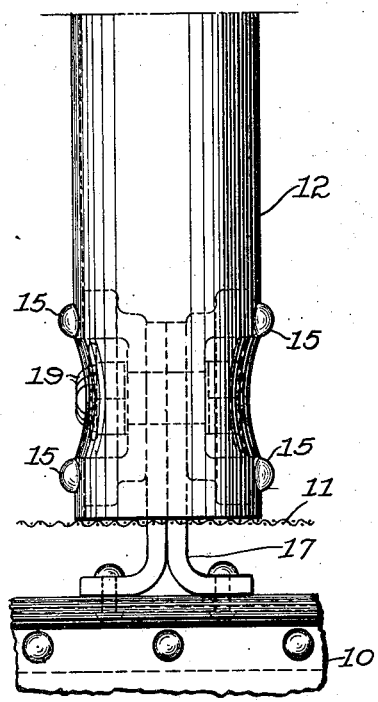

Other objects and features of novelty will appear as I proceed with the description of that embodiment of the invention which, for the purposes of the present application, I have illustrated in the accompanying drawing, in which Figure 1 is a front elevation of the lower end of an airplane strut with fragments of the wing structure to which it is attached.

Figure 2:
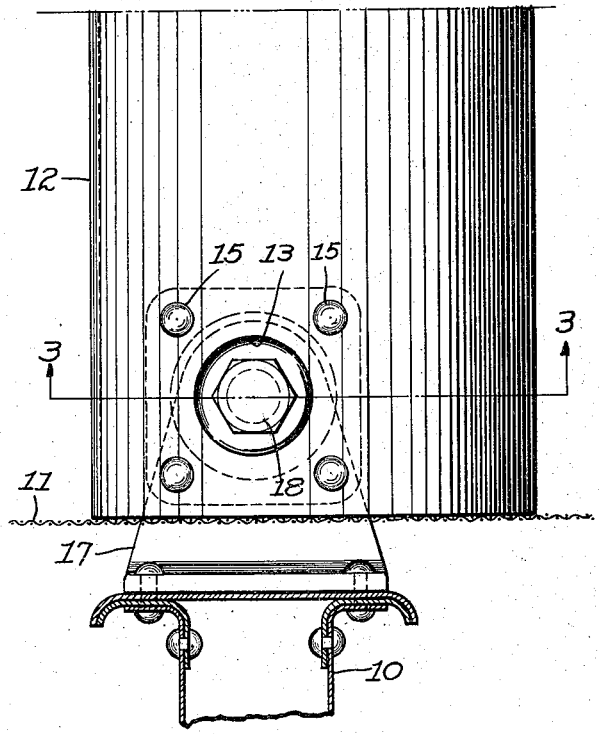
Figure 3:
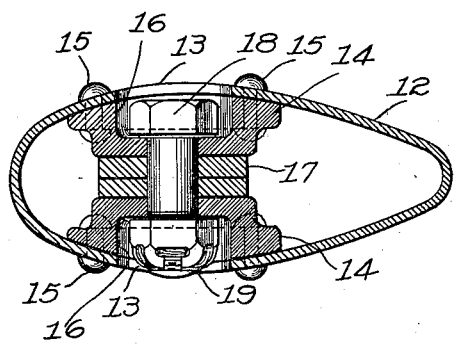

Figure 2 is a side elevation of the same with the wing beam shown in transverse section, and Figure 3 is a horizontal sectional view substantially on the line 3—3 of Figure 2.

In the drawings we have illustrated at 10 a fragment of the wing beam for an airplane, said beam being located a short distance below the wing cover or skin 11. A strut 12 is shown positioned above and in contact with the skin 11. This strut is a hollow post which is preferably bent into the conventional streamline form as is shown in Figure 3. It is located above the wing beam 10 by preference, although some other part of a wing frame might serve as the anchoring member.

Near its lower end the strut is provided with oppositely located openings 13, and as a sort of frame for each of these openings we attach to the inner wall of the strut a bracket 14, which may be a casting or a forging, and which is secured to the strut by means of rivets 15 or the like. The brackets 14 each have relatively deep sockets 16 that are of the same diameter and register with the openings 13.

Between the brackets 14 of each strut there is located the upper end of a duplex fitting 17, the lower portions of which are bent outwardly away from each other to form feet that are secured to the top element of the wing beam 10.

A headed bolt 18 is inserted through aligned openings in the brackets 14 and the fitting 17, and all of these parts are clamped in place by means of a nut 19 which is preferably castellated so that it may be positively locked upon the bolt. The nut 19 and the head of the bolt 18 both lie within or substantially within the sockets 16 and do not project appreciably beyond the streamline surfaces of the strut. Obviously the upper end of the strut, not illustrated, may be mounted in the same manner substantially, and the construction may be adapted for use in other positions upon flying machines of various types.

Having thus described our invention what we claim is:

1. In combination, a hollow strut having opposed openings in the walls thereof, brackets secured to the inner sides of said walls having sockets opposite said openings, a fitting extending into said strut endwise to a position between said brackets, and a bolt extending through said brackets and fitting with the head and nut thereof enclosed by said sockets.

2. In combination, a hollow streamline strut having opposed openings in the side walls thereof near one end of the strut, brackets secured to the inner sides of said walls having sockets opposite said openings, a fitting extending into said strut endwise to a position between said brackets, and a fastening extending through said brackets and fitting having its ends within said sockets substantially within the streamline surfaces of the strut.

3. In combination, a hollow strut having opposed openings in the walls thereof, a bracket positioned internally of the strut and secured thereto, said bracket being formed to leave unobstructed spaces within the strut directly adjacent said openings, a fitting extending into said strut endwise to a position adjacent said bracket, and a bolt extending through said bracket and fitting with the head and nut thereof occupying the said spaces.

In testimony whereof, we hereunto affix our signatures.

GEORGE E. ARMINGTON.
ROBERT G. NIGHTINGALE.